March 13, 1934.  F. P. QUINN  1,950,998
WHEEL COUPLING DEVICE
Filed Jan. 18, 1932
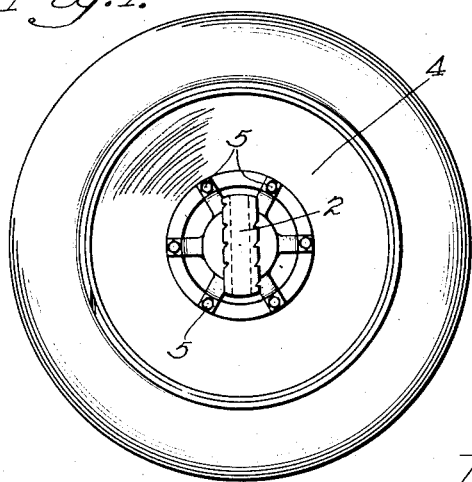
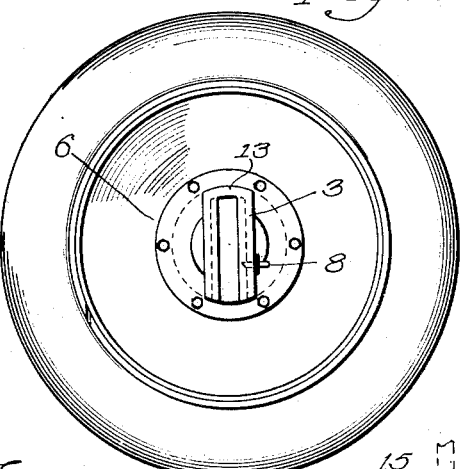
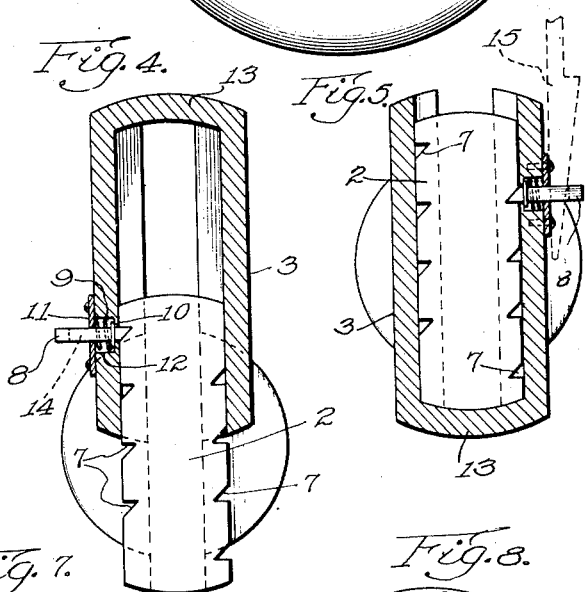
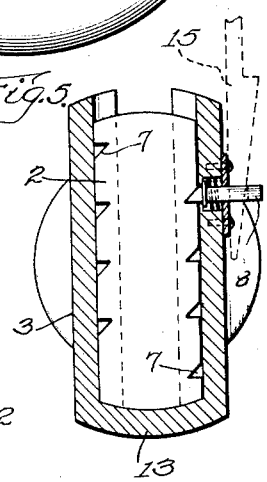
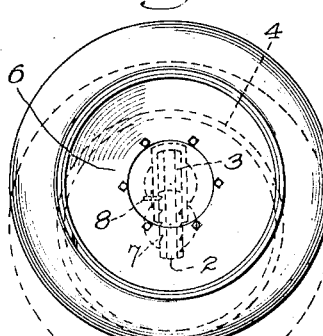
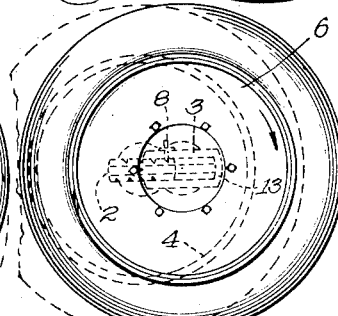
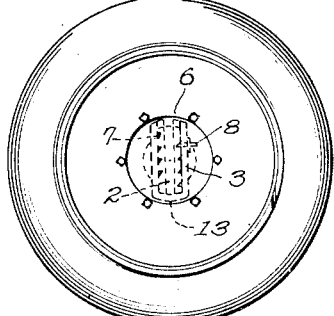
Inventor
Francis Patrick Quinn.
Witness
Arthur M. Franke.
by Rummler Rummler & Woodworth, Attys.

Patented Mar. 13, 1934

1,950,998

UNITED STATES PATENT OFFICE 1,950,998

WHEEL COUPLING DEVICE

Francis Patrick Quinn, Havelock, Ontario, Canada

Application January 18, 1932, Serial No. 587,335

9 Claims. (Cl. 301—38)

This invention relates to an improvement in the attachment of spare wheels by which they slide into an operative position without the use of any tools.

The main object of my improvement is to provide an arrangement of parts by which a spare wheel can be rapidly and easily attached to a mounted automobile wheel; and further to provide a coupling device which through the rolling action of the wheel will raise the axle of a vehicle to normal level; to provide a coupling device which will automatically lock the coupler in alignment with the axle of the vehicle; to provide detachable and interchangeable coacting coupling parts for the mounted wheel and on the spare wheel; to provide a coupler which will hold the spare wheels in parallel alignment with a mounted wheel and provide extra traction.

An illustrative embodiment of my invention is shown in the accompanying drawing, wherein Figure 1 is a front face view of a mounted automobile wheel with one section of the coupler attached.

Fig. 2 shows the inner face of a spare wheel with the coacting part of the coupler attached.

Fig. 3 is a plan view showing the coupler parts in coacting relation.

Fig. 4 is a section on the line 4—4 of Fig. 3, with the coupler started into engaged position.

Fig. 5 is a section on the line 4—4 of Fig. 3, with the coupler in locked position.

Fig. 6 shows a mounted wheel with a deflated tire and a spare wheel with its center above the center of the mounted wheel.

Fig. 7 is the same as Fig. 6, after the wheels have been turned one-quarter of a revolution, showing deflated wheel raised.

Fig. 8 is the same as Figs. 6 and 7, showing coupling completed by gravity.

For illustrative purposes, the coupler 1 shown in Fig. 3 comprises an arm, tongue, or T-head section 2, and a socket or T-slot section 3, the T-head section 2 being attached to the outer side of the mounted vehicle wheel 4 by bolts 5, so that the T-head is spaced away from the end of the axle on which the wheel 4 is mounted.

In a similar manner the T-slot section 3 of the coupler 1 is symmetrically bolted to the inside of an unmounted or spare wheel 6. Both edges of the T- head 2 are provided with holding notches 7, and the T-slot section 3 is provided with a spring latch 8, positioned to coact with notches 7. The latch is normally held in operative position by a spring 9 coiled about the latch 8 and held between a thrust bearing 10 and a plate 11 in a recess 12.

The T-slot is closed at one end by an integral cap 13. The projecting end of the latch 8 has a slotted aperture 14 adapted to receive a tapered unlatching key 15, shown in dotted lines in Fig. 5.

In operation one of the coupler sections is bolted on the outside of the mounted wheel of the vehicle; the other section is bolted on the inside of the spare wheel. One of the principal uses of my invention is to rapidly restore an automobile to running condition after a tire has been deflated. The deflation of the tire places the car axle below its normal level. To mount the spare wheel with my rapid coupler, the deflated wheel is turned until the projecting T-head approximates a vertical position, as shown in Figs. 1 and 4. When the T-head has entered the T-slot on the spare, so that the latch engages one of the notches, the motor is put in gear and the wheel is turned one-quarter of a revolution. The eccentric action of the coupler raises the axle of the vehicle to normal level, and in the following one-quarter of a revolution the weight of the car forces the T-head to rest on the capped end of the T-slot, in which position it is retained by the latch.

When the vehicle has arrived where repairs can be conveniently made, the wheel is turned to the position where the capped end of the T-slot is uppermost, the tapered key is forced into the slot in the latch, removing it from engagement with the notch in the T-head. Then the spare wheel is free to be lifted and uncoupled.

While for illustrative purposes I have set forth the lifting and coupling action of my coupler, when used for quick road work following deflation of a tire, it will be understood that the same device will couple spare wheels onto mounted wheels with full tires and provide more traction, such as required on sand roads and the like. Experience has proved that double wheels are superior to chains on slippery roads. My simple coupling device makes the use of spare wheels for double traction more convenient and less expensive than chains.

The coupling sections are here shown detachably attached to vehicle wheels. It will be readily understood that the sections may be made integral with either wheels or with the wheel mounting, or that a wheel may have one section of the coupler on one side and the other section on the opposite side.

The advantages of this simple construction comprise the reduction of time and labor required where a separate elevating unit must be applied, the wheel taken off, replaced by a spare, and followed by the removal and storage of the elevator; also the reduction of hazard of changing wheels on highways through reduction of time required, and especially the annoyance and labor required in finding, placing, operating, and the recovery of the jack. On sand roads, in deep snow, and on slippery pavements, the spares may be almost instantly attached, thereby dividing the load and increasing the traction.

The broader distribution of the load to traction surfaces tends to prevent sinking of the wheels in soft gravel, sand, mud or snow, and also gives an increased margin of safety from skidding, increases the vehicular stability, and substantially removes the use of troublesome chains. The presence of the coupling does not in any way interfere with the use of the wheels in the usual way. When the spares are not required, they are easily disconnected by the use of the tapered key.

Although but one specific embodiment of this invention has been herein shown and described, it will be understood that certain details of the construction shown may be altered or omitted without departing from the spirit of this invention as defined by the following claims.

I claim:

1. In combination with a mounted automobile wheel, a coupling comprising a section secured on the mounted wheel and having a T-head, a coacting section secured on a spare wheel and provided with a T-slot which is complemental to said T-head, and latch means on said coacting section which will permit relative radial movement while said sections slide into operative concentric relation and will prevent radial separation of such sections when in partially coupled eccentric relation.

2. In combination with a mounted automobile wheel and a spare wheel, a coupling comprising a T-headed section on said mounted wheel, a coacting section of said coupling having a T-slot on said spare wheel, and a latching means comprising a spring actuated bolt on said coupling adapted to prevent radial separation of said sections and to hold the same together when in partially coupled eccentric relation, said sections being adapted to be automatically forced into concentric relation by the rotation of said mounted wheel and locked in such position by said latch.

3. In combination with a mounted automobile wheel and a spare wheel, a coupling comprising slidably coacting sections, one of said sections being secured on the mounted wheel and provided with a T-head and the other section being secured on said spare wheel, and having a T-slot, and means on one of said coupling sections provided with a spring actuated bolt adapted to hold said sections in partially coupled position with the center of said spare wheel and the center of said mounted wheel in eccentric relation and lock said couplings together when said mounted wheel is turned and said wheels move into concentric relation.

4. A coupling for attaching a spare wheel to a mounted wheel on a vehicle which comprises a coupling part having a T-head and a coupling part having a T-slot, one of said parts being secured to one of said wheels concentric with the hub thereof and the other of said parts being secured to the other of said wheels concentric with its hub, said parts being adapted for slidable engagement with each other and adapted to prevent axial separation thereof, and means on said coupling parts to prevent radial separation thereof.

5. The combination of a mounted wheel having a hub member with an arm extending at right angles to the axis of said wheel, and a socket member adapted to be secured to and extend outwardly of and rotate with a spare wheel, said socket member having a socket extending at right angles to the axis of said spare wheel and adapted to receive said arm when the axis of said hub member and the axis of said wheel are out of alinement and to slidingly guide them into alinement, and means for locking said arm in said socket when said wheels are in alined position, said socket and socket member being formed to embrace said arm for more than one-half of the perimeter of its cross-sectional area.

6. In combination with a mounted automobile wheel and a spare wheel having hub members, a coupling member comprising a section secured to one of said wheels and being provided with a T-slot, a coacting section of said coupling member secured to the hub of the other of said wheels and being provided with a T-tongue adapted to be inserted in said slot and prevent axial separation thereof, said sections being adapted to be automatically forced into concentric relation by the turning of one of said wheels, and latching means on and extending through one of the walls of said slotted section and adapted to lock said sections together and prevent radial separation thereof.

7. In combination with an automobile spare wheel and a mounted wheel, a coupling comprising a T-headed section mounted on one of said wheels, the head of said T being provided with mutually spaced notches, a coacting section provided with a T-slot mounted on the other of said wheels and latching means on said coacting section comprising a spring actuated bolt, said coacting section being adapted to slidably engage said T-headed section and prevent axial separation thereof while permitting relative inward radial movement, said bolt adapted to slide into the notches on said T-head and prevent outward radial movement of said sections when said wheels are rotated and to lock said sections together when said wheels are moved into concentric relationship.

8. The combination of a mounted automobile wheel having a hub member with an arm extending at right angles to the axis of said wheel, and a socket member adapted to be secured to and extend outwardly of and rotate with a spare wheel, said socket member having a socket extending at right angles to the axis of said spare wheel and adapted to receive said arm when the axis of said hub member and the axis of said wheel are out of alinement and to slidingly guide them into alinement and means for locking said arm in said socket when said wheels are in alined position.

9. In combination with a mounted automobile wheel and a spare wheel having hub members, a coupling member comprising means secured on the hub of one of said wheels, coacting means on the hub of the other of said wheels, said means and coacting means adapted to slidably interfit and prevent axial separation of said wheels when said wheels are rotated, and a latching device on one of side means arranged to prevent radial separation of said wheels when said wheels are in eccentric relationship and locking said wheels when said wheels are in concentric relationship.

FRANCIS PATRICK QUINN.